United States Patent Office 3,465,021
Patented Sept. 2, 1969

3,465,021
PREPARATION OF AROMATIC ISOCYANATES
Andrew John Nicholas and Harry James Twitchett, Manchester, England, assignors to Imperial Chemical Industries Limited, Millbank, England, a corporation of Great Britain
Filed May 26, 1965, Ser. No. 458,965
Claims priority, application Great Britain, May 29, 1964, 22,310/64, Patent 1,034,285
Int. Cl. C07c 119/04
U.S. Cl. 260—453   7 Claims

ABSTRACT OF THE DISCLOSURE

A process for the production of organic isocyanates which includes reacting phosgene with a primary amine in the presence of an inert organic diluent. The initial chemical combination of these reactants is performed by separately introducing liquid phosgene and a solution of the primary amine in an inert liquid organic diluent into a tubular reactor through which a stream of a mixture in the same inert organic liquid diluent of phosgene, and the initial reaction products resulting from interaction of phosgene and primary amine is passing continuously by recirculation. The temperature in the reactor is maintained at about 8° to 50° C. and phosgene is added to the recirculating stream of the mixture in amounts of 5 to 20 mols of phosgene per mole of amino group present in the primary amine added thereto.

---

Figure 1:
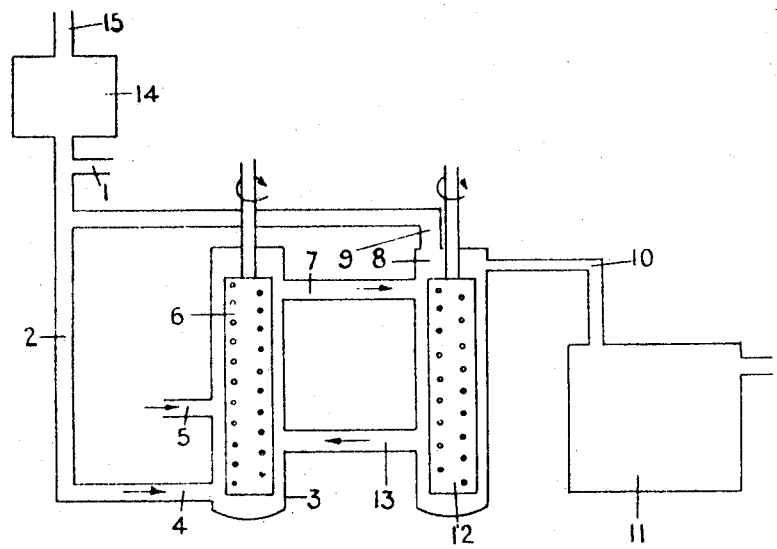

The present invention relates to the manufacture of organic isocyanates.

According to the present invention we provide a process for the manufacture of organic isocyanates by reacting phosgene with a primary polyamine in the presence of an inert organic diluent wherein the initial chemical combination of the reactants is performed by separately introducing liquid phosgene and a solution of the primary amine in an inert liquid organic diluent into a tubular reactor through which a stream of a mixture in the same inert organic liquid diluent of phosgene, and the initial reaction products resulting from interaction of phosgene and primary amine is passing continuously by re-circulation.

A suitable form of apparatus in which to conduct the process for example comprises two cylindrical vessels interconnected by tubes so that the reaction mixture can be circulated continuously from one vessel to the other. Alternatively the apparatus may be in the form of a simple tubular reactor formed into a ring, round which the reaction mixture may be made to flow. The apparatus is provided with entry ports to introduce the reactants and with exit ports to draw off the reaction mixture or portions thereof as may be desired.

The tubular reactor may be in the form of a tube of any cross-section, for example it may be circular or polygonal in cross-section, alternatively it may be a tapered tube for example in the form of a conic frustum.

The reaction mixture is agitated for example by means of stirrers which are designed to cause it to flow round the reaction circuit. The highly exothermic nature of the reactions involved also promotes circulation.

The interaction in the tubular reactor is preferably within the temperature range from 8° C. to 50° C. The temperature employed depends to some extent on the pressure. Usually conditions are adjusted to introduce the phosgene into the reaction mixture at a temperature below the boiling point of phosgene at the prevailing pressure. It is preferred to operate at or slightly above atmospheric pressure. Usually from 5 mols to 20 mols of phosgene are added to the circulating stream of reaction mixture per mole of amine group present in the primary amine added thereto. The primary polyamine is preferably introduced into the reaction mixture as a solution in an inert diluent usually at a strength between 2% by weight and 20% by weight.

The operation of the improved process and its underlying principles are made clear by considering the nature of the chemical reactions involved.

The prior art reveals that when phosgene and a primary amine, optionally in an inert solvent are brought together, the following reactions occur simultaneously:

(1) $-NH_2 + COCl_2 \rightarrow -NH.CO.Cl + HCl$
(2) $-NH_2 + HCl \rightarrow NH_2.HCl$
(3) $-NH.CO.Cl \rightarrow -NCO + HCl$
(4) $-NH_2 + -NCO \rightarrow -NH.CO.NH-$ Reactions (1) and (3) are fast and thus reactions (2) and (4) making use of products of the initial reactions can proceed concurrently. In a process for the manufacture of an isocyanate, reaction 2 is not undesirable as amine hydrochloride can be readily converted first into carbamyl chloride and then into an isocyanate at a subsequent stage. Reaction 4 however is most undesirable as substituted ureas once formed are converted only partially and then with some difficulty under conditions of high temperature to the desired isocyanate.

Primary amine brought into contact with phosgene is thus seen to take part in three competitive reactions (1), (2) and (4). In the process of the present invention the last named reaction (4) is minimized by having present a very high concentration of phosgene in the reaction zone to promote reaction (1) while the dissociation of carbamyl chloride is limited by operating at a relatively low temperature. When a primary amine and phosgene are reacted together, the highly exothermic reaction usually results in the amine hydrochloride (reaction 2) being produced in a coarse physical form which reacts subsequently with phosgene at an unsatisfactory rate:

$$-NH_2.HCl + COCl_2 \rightarrow NHCOCl + 3HCl$$

In the prior art processes to limit the formation of coarse particles and to provide some measure of control in the highly exothermic reaction, the primary amine is usually dissolved in an inert solvent. Excessive dilution is undesirable however as the solvent must ultimately be distilled from the isocyanate produced. It has now been found that formation of coarse particles can be minimized and good control of the reaction achieved, without recourse to excessive dilution by re-circulating a proportion of the reaction mixture, which contains phosgene and solvent as well as precipitated material, to the reaction zone.

By operating in the above manner very thorough mixing is obtained, the rapid removal of heat of reaction is facilitated, and the solid products of interaction are obtained in a satisfactory physical form for the reactions involved to be completed, if necessary by the application of external heat, in additional vessels provided for the purpose. The completion of reaction may be carried out continuously or discontinuously.

Organic polyisocyanates of good purity are produced in excellent yield by use of the process.

Suitable forms of apparatus in which to perform the reaction are shown in the accompanying drawings.

Figure 2:
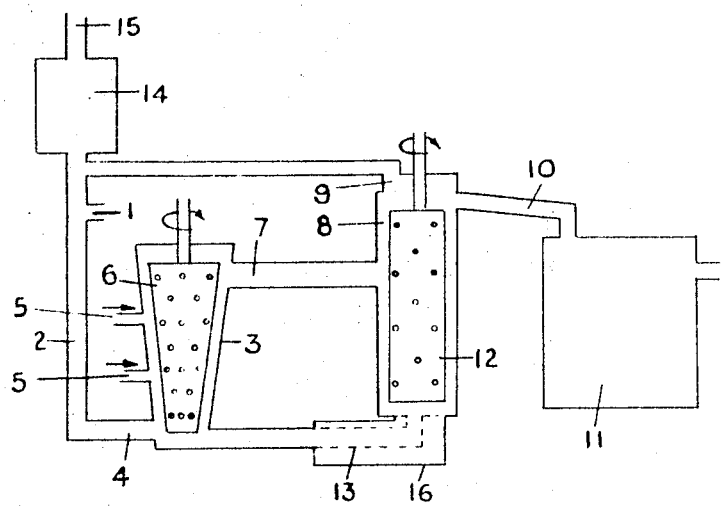

Diagrammatic sketches of suitable forms of apparatus for carrying out the process of the present invention are shown in the accompanying drawings FIGURES 1 and 2.

Referring to FIGURE 1 the apparatus comprises a tubular reactor 3 and a vessel 8 connected together by two tubes, an upper tube 7 and a lower tube 13. The tubular reactor 3 and the vessel 8 are both provided with stirrers 6 and 12 respectively. The tubular reactor 3 is also provided with an inlet 5 for the introduction of amine solution and with an inlet 4 for liquid phosgene connected by a pipe 2 with a source of phosgene (not shown) at 1, and a condenser 14 carrying an outlet vent 15. The vessel 8 carries a vent tube 9 connected to the pipe 2 and thus to the condenser 14. The vessel 8 is also provided with a side arm 10 which connects with a further heated vessel 11 in which the phosgenation is completed.

The apparatus shown in FIGURE 2 is similar to that of FIGURE 1 with minor modifications. Thus, in FIGURE 2 the reactor 3 is not cylindrical but is in the shape of an inverted conic frustum and carries two inlets 5 for the introduction of amine solution, additionally the lower tube 13 connecting the reactor 3 and the reaction vessel 8 is partially surrounded by a cooling jacket 16 where it leaves the vessel 8.

When the apparatus is in use phosgene is introduced at 1 into the pipe 2 and flows down the pipe 2 to enter the tubular reactor 3 at the inlet 4 where it mixes with the circulating reaction mixture and flows up the reactor meeting a stream of amine dissolved in an inert solvent and introduced at the inlet 5. The amine solution and phosgene are thoroughly mixed with the reaction mixture by means of the stirrer 6 and the mixture passes out of the tubular reactor 3 via the upper tube 7 into the vessel 8. A proportion of the mixture flowing into the reaction vessel 8 is recirculated via the lower tube 13 to the tubular reactor 3. The remainder of the mixture flowing into the vessel 8 passes through the side arm 10 into the heated vessel 11 in which the phosgenation is completed. Phosgene volatilized by the heat of reaction passes out from the vessel 8 via the vent tube 9 and is liquefied either in the condenser 14, or by means of a compressor (not shown) and flows back as make-up phosgene to mix with the phosgene supply entering at 1. It is found unnecessary to remove the small amount of dissolved hydrogen chloride from the make-up phosgene before the phosgene is re-circulated to the apparatus. Waste gases, e.g. hydrogen chloride leave the apparatus through the outlet vent 15. The phosgenation involved may be completed in the heated vessel 11 by heating to a suitable temperature with or without the addition of phosgene as desired.

For the single heated reaction vessel 11 there may be substituted a number of heated reaction vessels operating at different temperatures, the reaction mixture flowing continuously from one vessel to another.

The above process details although related to the apparatus of FIGURE 1 are equally applicable to that of FIGURE 2.

The stirrer in the tubular reactor 3 may be designed in a variety of ways, for example it may consist of a single blade of metal either with or without perforations, alternatively it may consist of four blades mounted on a shaft forming the axis of rotation.

If desired the apparatus may be operated at super atmospheric pressure. Suitable inert organic diluents for use in the process are any of those already proposed for the manufacture of organic isocyanates by phosgenation methods for example hydrocarbons such as toluene and xylene, halogenated hydrocarbons such as monochloro- and dichlorobenzenes, chlorotoluene, trichlorofluoromethane, esters such as ethyl, butyl and hexyl acetates, and dimethyl and diethyl carbonates.

The process is useful for the manufacture of a wide variety of organic isocyanates but is especially useful for the manufacture of tolylene diisocyanate, in particular for the manufacture of mixtures of the 2,4- and 2,6-isomers, diphenylmethane - 4,4' - diisocyanate, 3 - dimethyldiphenylmethane-4,4'-diisocyanate, m- and p-phenylenediisocyanate diphenyl-4,4'-diisocyanate and naphthalene-1,5-diisocyanate.

The invention is illustrated by the following examples.

Example 1

In a small scale apparatus of the type shown in FIGURE 1 the volume of 3 is approximately 50 cc. and that of 8 is approximately 150 cc. The two agitators revolve at the rate of 600 and 300 r.p.m. respectively.

The process is started by filling the reactor with monochlorobenzene. Liquid phosgene at 7° C. is added continuously to the bottom of 3 at the rate of 12 g./min. Through inlet 5 a 10% wt./wt. solution of the mixed 2,4- and 2,6-isomers of tolylene diamine dissolved in monochlorobenzene at 90° C. is added continuously. The liquid reaction mixture circulates through 7 to 8 and through 13 to 4. Excess reaction mixture overflows through 10 to a further reactor of conventional design (11) maintained at 90° C. Here a slow stream of phosgene is passed continuously. This reactor has a volume of approximately 2000 cc. and has a top overflow. The crude isocyanate which flows from this reactor is degassed and then distilled under reduced pressure by conventional methods.

A yield of 96% of distilled tolylene diisocyanate based on the amount of tolylene diamine fed to the first reactor is obtained.

Example 2

The tolylene diamine solution of Example 1 is replaced by an 8% wt./wt. solution of the mixed 2,4- and 2,6-isomers of tolylene diamine dissolved in ortho-dichlorobenzene, the remaining conditions being the same.

A yield of 98.2% of distilled tolylene diisocyanate based on the amount of tolylene diamine fed to the first reactor is obtained.

Example 3

This is carried out in the apparatus used in Example 1. The agitator in the tubular reactor 3 operates at 100 r.p.m. and that in vessel 8 at 300 r.p.m.

The process is started as in Example 1 by filling the reactor with ortho-dichlorobenzene. Liquid phosgene at 6°–7° C. is added continuously to the bottom of 3 through the inlet 4 at the rate of 12 g./min. At the inlet 5 an 11.5% wt./wt. solution of tolylene diamine in orthodichlorobenzene at 90° C. is fed to the tubular reactor 3 continuously at the rate of 8.0 g./min. The tolylene diamine is a mixture of isomers comprising approximately 80% 2,4- 19.8% 2,6- and 0.2% 3,4-tolylenediamine.

The fluid reaction mixture circulates through 7 to 8 and through 13 to 4. Excess reaction mixture overflows through 10 to a further reaction 11 of conventional design maintained at 90° C. The excess phosgene which is evolved together with hydrogen chloride, is recovered and used together with fresh phosgene to feed to reactor 3.

A yield of 97% of distilled tolylene diisocyanate based on the amount of tolylene diamine fed to the first reactor is obtained.

What we claim is:

1. In a process for the manufacture of organic isocyanates by reacting phosgene with a primary aromatic polyamine in the presence of an inert liquid organic diluent, the improvement which comprises performing the initial chemical combination of the reactants by separately introducing liquid phosgene and a solution of the primary aromatic polyamine in the inert liquid organic diluent wherein said primary aromatic polyamine is present in amounts of about 2–20 weight percent of said solution into a tubular reactor through which a stream of a mixture, in the same inert liquid organic diluent, of phosgene and a part of the initial reaction products resulting from interaction at a temperature below 50° C. of phosgene and primary aromatic polyamine is passing continuously by recirculation, the amount of phosgene added to the recirculating stream being from 5 mols to 20 mols of phosgene per mole of amino group present in the primary aromatic polyamine added to the recirculating stream.

2. A process according to claim 1 wherein the reaction within the tubular reactor is carried out at a temperature between 8° to 50° C.

3. A process according to claim 1 wherein the reaction within the tubular reactor is carried out at least about atmospheric pressure.

4. The process according to claim 1 wherein the inert liquid organic diluent is selected from the group consisting of monochlorobenzene and o-dichlorobenzene.

5. The process according to claim 1 wherein the primary aromatic polyamine is a diamine.

6. The process according to claim 1 wherein the primary aromatic polyamine is tolylene diamine.

7. The process according to claim 6 wherein the tolylene diamine is a mixture of 2,4- and 2,6-isomers of tolylene diamine.

References Cited

UNITED STATES PATENTS

| | | | |
|---|---|---|---|
| 2,680,127 | 6/1954 | Slocombe et al. | 260—453 |
| 2,822,373 | 2/1958 | Beck | 260—453 |
| 3,188,337 | 6/1965 | Gemassmer | 260—453 |

OTHER REFERENCES

Groggins: "Unit Processes in Org. Syn.," McGraw-Hill Book Company, Inc. New York, 1958, Fifth Ed., pp. 42 and 448 relied upon.

CHARLES B. PARKER, Primary Examiner

DOLPH H. TORRENCE, Assistant Examiner

U.S. Cl. X.R.

23—260